Aug. 24, 1943.  M. R. HUTCHISON, JR  2,327,795
AUTOMATIC SCREW DRIVER
Filed May 15, 1941  2 Sheets-Sheet 1
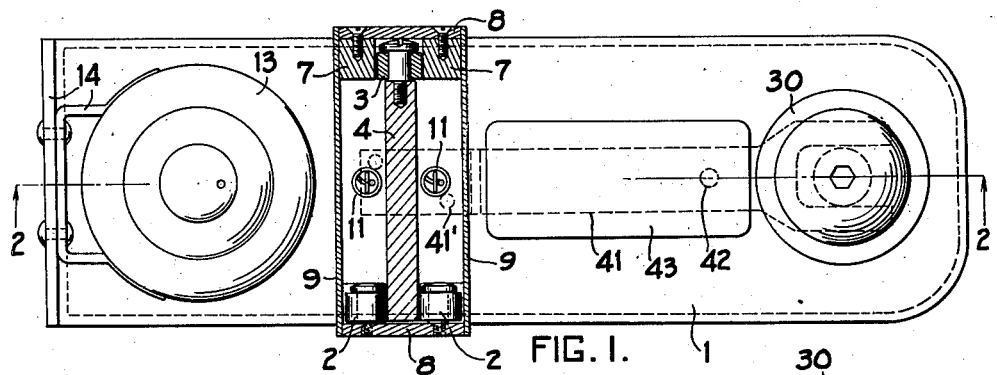
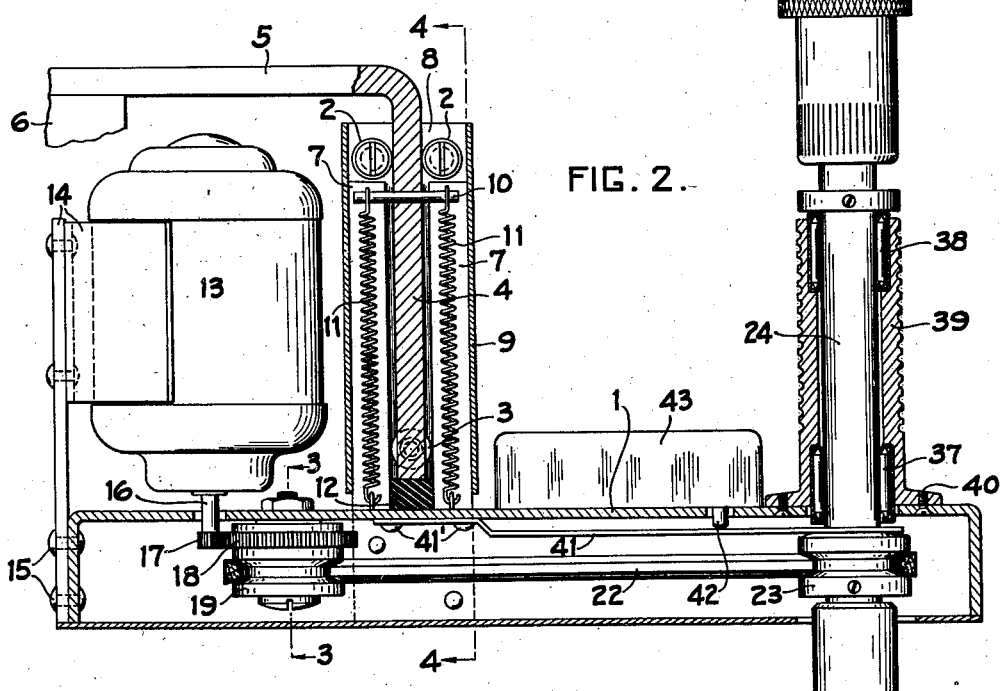
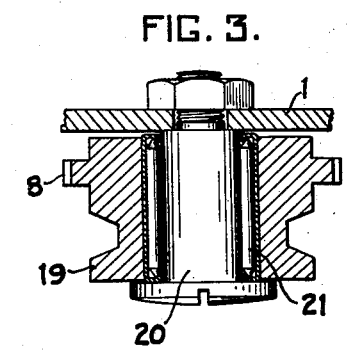
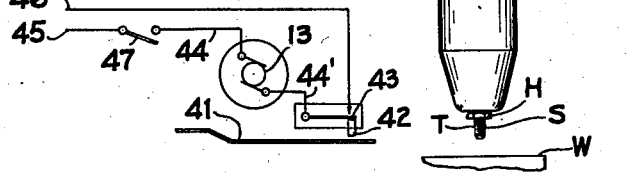
MILLER R. HUTCHISON, JR.
*INVENTOR*
BY
*ATTORNEYS*

Aug. 24, 1943.  M. R. HUTCHISON, JR  2,327,795
AUTOMATIC SCREW DRIVER
Filed May 15, 1941  2 Sheets-Sheet 2
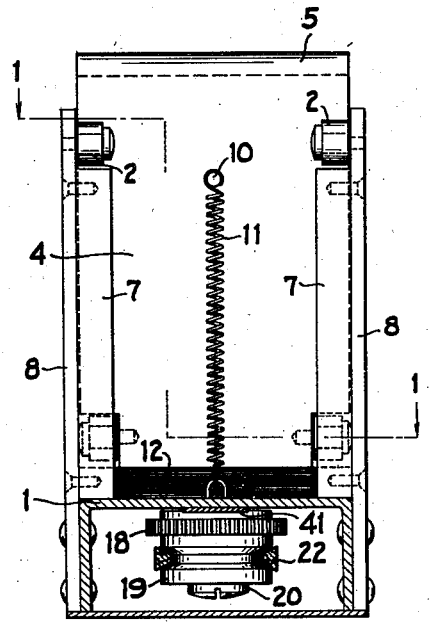
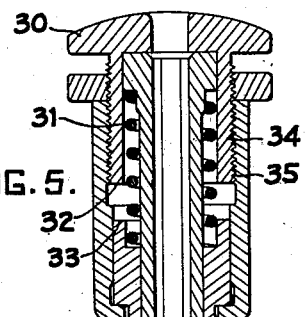
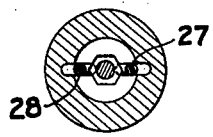
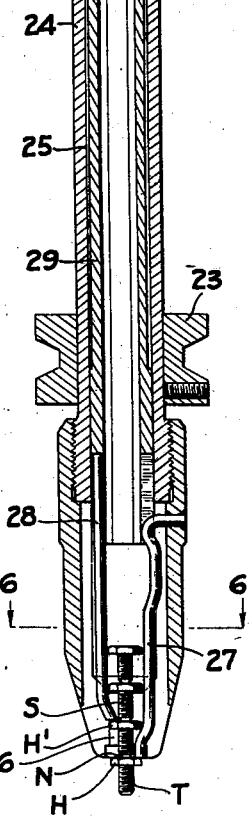
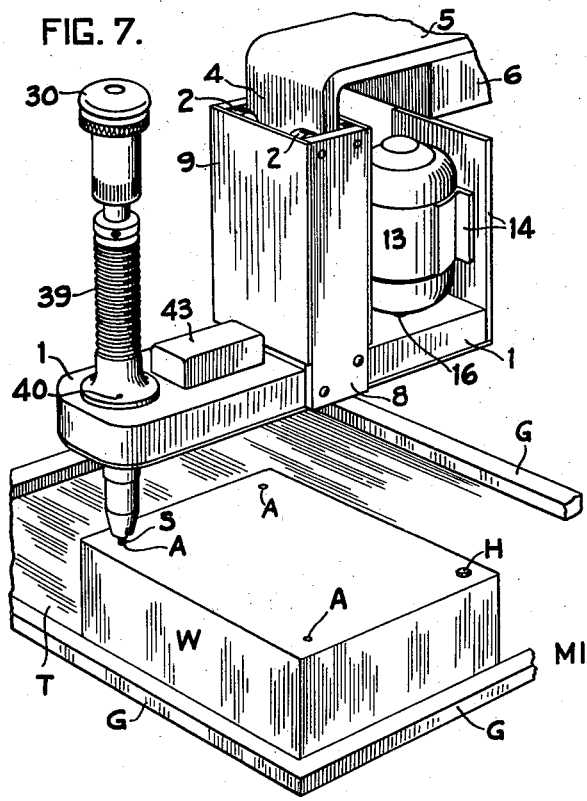
MILLER R. HUTCHISON, JR.
INVENTOR
BY
ATTORNEYS Patented Aug. 24, 1943

2,327,795

UNITED STATES PATENT OFFICE 2,327,795

AUTOMATIC SCREW DRIVER

Miller R. Hutchison, Jr., Rochester, N. Y., assignor to Eastman Kodak Company, Rochester, N. Y., a corporation of New Jersey Application May 15, 1941, Serial No. 393,570

5 Claims. (Cl. 144—32)

This invention relates to automatic machines for driving screws. One object of my invention is to provide a screw driving machine with which screws may be rapidly and accurately driven into work. Another object of my invention is to provide a screw driving machine which may drive screws from a screw stick into work. Another object of my invention is to provide a machine for driving screws in which a screw is brought into contact with work, thus automatically causing a motor to rapidly drive the screw into work by power. Still another object of my invention is to provide a motor driven screw driver with a motor which is operated only during the times that screws are being driven and to provide an automatic control for the motor which may operate without attention from an operator. Other objects will appear from the following specification, the novel features being particularly pointed out in the claims at the end thereof.

Coming now to the drawings wherein like reference characters denote like parts throughout:

Fig. 1 is a top plan view of a typical automatic screw driving machine constructed in accordance with a preferred embodiment of my invention;

Fig. 2 is a section on line 2—2 of Fig. 1, some of the parts being shown in elevation;

Fig. 3 is an enlarged detail section on line 3—3 of Fig. 2;

Fig. 3A is a wiring diagram;

Fig. 4 is a front elevation, parts being shown in section of a roller slide carrying the automatic screw driver support;

Fig. 5 is an enlarged sectional view through the screw driver for use in holding screw sticks in my machine;

Fig. 6 is a sectional view on line 6—6 of Fig. 5;

Fig. 7 is a fragmentary prospective view showing a portion of the screw driver in operative relationship with work; and Fig. 8 is a fragmentary side elevation of a screw stick for use in connection with my automatic screw driver.

This invention is particularly directed to the use of screw sticks in which a plurality of screws are integrally formed on rod stock, each screw consisting of a head, a threaded portion, and a narrow neck connecting the threaded portion of one screw to the head of the next adjacent screw. Such screw sticks are shown in my copending application Serial No. 306,504, filed November 28, 1939, and resulting in Patent No. 2,247,499, granted July 1, 1941.

The screw driver is of a type especially designed to utilize such screw sticks and is substantially like the screw driver shown in my copending application Serial No. 306,505, filed November 28, 1939, and resulting in Patent No. 2,247,500, granted July 1, 1941. In the present embodiment, instead of utilizing such a screw driver to drive screws by hand, the screw driver is automatically rotated.

As pointed out in my two above-mentioned applications, some of the advantages of utilizing a screw stick are that, since the neck between two integral screws is of a predetermined size and strength, a predetermined torque can be applied to drive the screws and this torque can be arranged to accurately seat each screw without the usual difficulties which occur in driving screws of the usual type, of setting certain screws too tightly, thus perhaps distorting the work or not tightening the screws sufficiently to hold the parts of the work together. By adding an automatic drive for turning the screws into the work it greatly reduces the labor of an operator in driving screws, it increases the output, and it produces a considerably better product, all screws will be uniformly seated in the work, and each screw will hold with the same tension as the driving conditions are always uniform.

As a preferred embodiment of my invention, I have shown an automatic screw driver mounted on a support which is vertically movable to bring screws into contact with work. It is obvious that the support carrying the automatic screw driver may be mounted in any desired manner or may be made portable in a similar manner to the standard types of portable drills which may be provided with a pistol grip type of handle. However, I have found the described embodiment of my invention an extremely useful one for bench work.

Referring to Figs. 1 and 2, the screw driver may consist of a support 1 which may be mounted by means of a plurality of rollers 2 and 3 to move vertically with respect to a fixed track member 4 which may, in turn, include a bent arm 5 supported on a bench 6.

The roller 3 may be carried by the track 4 and may be adapted to engage the two spaced rails 7 carried by the support 1. The rollers 2 are preferably carried by an end wall 8 which forms a part of the housing 9, also carried by the support 1.

The track 4 carries a shaft 10 supporting one end of a pair of springs 11 attached at their lower ends to the support 1, these springs normally holding the support 1 in Fig. 2. Thus, the support 1 may be lowered a short distance—say ½"—to bring a screw into contact with work as will be hereinafter more fully described.

The support 1 carries a motor 13 on a bracket 14 attached to the support by rivets 15, and the motor shaft 16 carries a pinion 17 meshing with a gear 18 for rotating a pulley 19. This pulley is carried by the stud 20 on suitable roller bearings 21. A belt 22, here shown as a V-shaped belt, connects the pulley 19 to a pulley 23 which carries the screw driver 24 (best shown in Fig. 5).

This screw driver is substantially the same as the screw driver shown in my copending application. It consists of a hollow handle 25 for receiving screw sticks S, as shown in Fig. 8, the head of one screw being adjacent a narrow neck N of the next screw, and having a threaded portion T adjacent the head and extending to the neck. These screw sticks may be provided in any length, but in the present instance I find screw sticks of 25–30 screws a very convenient size to use. In the present instance, the screws are small ones—the threads being .060", 90 threads per inch. The total length of the screws is approximately ⅛". This data is given merely to give a picture of the specific setup being described as, obviously, dimensions are otherwise unimportant and may be varied through extremely wide ranges. However, since small-sized screws are much more difficult to drive than large ones, because of the difficulty in handling, my automatic screw driver is particularly adapted for such work.

The screw sticks S are loaded into the hollow handle 25 of the screw driver and the head H of the lowermost screw extends below, or at least does not have driving contact with the formation 26 which closely fits the head of the next adjacent screw. Thus, when the screw driver 25 is rotated, the head H1 of the screw adjacent the head H of the lowermost screw is driven and the threaded portion T passes into the work until the head H is firmly seated therein, at which time the narrow neck N is twisted off.

The lowermost screwhead H is held by means of a spring arm 27 against rearward movement into the screw driver handle. After driving the lowermost screw, the next screw is advanced to driving position by means of a screw advancing plunger 28 fastened to the sleeve 29 which may be moved downwardly by pressure upon the handle 30 at the top of the screw driver, thus depressing the advancing member against the pressure of a spring 31. This movement is limited to exactly the length of a screw by means of a shoulder 32 which can only move downwardly until it strikes a shoulder 33 carried by the outer sleeve of the screw driver 24, the relative position of these stops being adjustable by the mating threads 34 and 35.

The screw driver 24 is mounted in a pair of bearings 37 and 38 which are carried by a handle 39 attached by screws 40 to the base 1. This handle is used to move the screw driver into contact with work. The roller bearings 37 permit the screw driver to turn freely when the motor 13 is operated and, in addition, the roller bearings permit limited vertical movement of the screw driver in the fixed handle 39 for the following reasons. The screw driver 24 is carried by a leaf spring 41 encircling the screw driver and attached by rivets 41' to the support 1. The weight of the screw driver is sufficient to flex the spring 41 downwardly, but when an operator grips the handle 39 and lowers the lowermost screw S into contact with work W, the screw driver slides upwardly in the handle 39 a slight distance sufficient to flex the spring 41 toward the base 1 and operate the plunger 42 of a Micro-Switch 43, thus making the circuit of the motor 13 which will then immediately and rapidly spin the screw S driving it into the work. The motor movement will continue until the screw S is seated, breaking off the neck N between this screw and the next adjacent screw. The springs 11 will then draw the support 1 upwardly and, as soon as pressure is relieved from the spring 41, the Micro-Switch 43 will break the circuit of the motor and this motor will cease operating.

The Micro-Switch which I prefer to use is a standard product manufactured by the Micro-Switch Corporation of Freeport, Illinois. It is known as the "green top" switch and is one in which the switch is normally opened but can be closed by a slight pressure upon the button shown at 42 in the drawings. This button may be depressed in the order of .001", at its point of contact with the spring arm 41, this slight travel being sufficient to cause a switch contact inside of the Micro-Switch casing to travel approximately .02" to make or break the circuit. Quite possibly there are other standard switches which might work satisfactorily, but I prefer this particular known type of switch.

From the wiring diagram in Fig. 3A, it will be noted that the motor 13 is connected through wires 44 and 44' to a source of power 45 and 46. The Micro-Switch 43 with its operating plunger 42 is positioned make and break the circuit through upward movement of the spring arm 41 and I find it convenient to provide a switch 47 which can be manually opened when the automatic screw driver is not being used.

From the above description it will be seen that my automatic screw driver has a number of advantages, one of which is that a screw, which is not being turned, is first brought into contact with the work as an operator grips the handle 39 and moves the support carrying the screw driver to the desired position. Light downward movement on the handle 39 flexes the springs 11, permitting the support to slide downwardly on the track 4 and, as the screw S touches the work, the spring 41 is flexed making the circuit, rotating the screw driver, and rapidly seating the screw. If, as illustrated, the automatic screw driver is mounted on a bench, it will always accurately hold the axis of the screw in proper alignment with the tapped aperture in the work so that there will be no danger of "cross threading."

As illustrated in Fig. 7, the work W can be conveniently guided on a plane table T having a guide rail G around the edge, the position of the guide rail and work being such that, by sliding the work on the table, any one of a number of tapped apertures A can be brought into alignment with the tool. Of course the design of the table where a permanently mounted automatic screw driver is used must conform to the particular work at hand. However, it has been found that with some care a setup can be provided which will permit an automatic screw driver to operate quite as rapidly as the fastest riveting machine on work of the same general nature.

If the automatic screw driver is not permanently mounted to move relative to a bench, but is of a portable type, an operator will have to use the same care which is always used with portable drills or other instruments to axially align screws with work.

While I have referred to the screw driver as driving screws into tapped openings and while, of course, it is particularly adapted for this purpose, it is to be understood that it can also be used for driving screws into openings designed to receive screws that are not threaded, such as known types of screw receiving members, such as "Tinnerman" nuts.

It is also to be understood that while I have described the preferred embodiment of my invention, it is obvious that the illustration shows only one preferred form of the broad idea shown herein of an automatic screw driver with which a screw, which is not turning, may be brought into contact with work, this contact automatically actuating a motor which will drive the screw into the work. I, therefore, consider as within the scope of my invention all such forms as may come within the scope of the appended claims.

I claim:

1. An automatic screw driving machine for driving successive screws of a screw stick into work, comprising, in combination, a support, a motor carried thereby, a screw driver of a type adapted to use screw sticks and to drive one screw from the head of another screw, means for mounting said screw driver on said support independently of and in lateral spaced relation to said motor to permit the ready insertion of screw sticks in said screw driver without necessitating the disconnection of the latter from said support, an electric circuit including the motor, a switch in said circuit, of a type normally open, a bearing in the support for movably carrying the screw driver, and connections between the motor and screw driver for rotating the latter from the former, means including said switch actuated by moving a screw carried by the screw driver into contact with work for moving the switch from its normal open position to a closed position whereby said screw contacting with the work may be driven into the work by said motor.

2. An automatic screw driving machine for driving successive screws of a screw stick into work, comprising, in combination, a support, a motor carried thereby, a screw driver of a type adapted to use screw sticks and to drive one screw from the head of another screw, an electric circuit including the motor, a switch in said circuit of a type normally held open and provided with an actuating plunger, a bearing in the support for movably carrying the screw driver, and connections between the motor and screw driver for rotating the latter from the former, means comprising a flexible member carried by said support and connected to said screw driver and actuated by moving the screw driver into contact with work for moving the flexible member into engagement with said plunger to close said switch whereby said screw contacting with the work may be driven into the work by said motor, said flexible member being carried by said screw driver when the latter is moved from said work after driving a screw to move said flexible member away from said plunger to open said switch.

3. An automatic screw driving machine for driving successive screws of a screw stick into work, comprising, in combination, a support, a motor carried thereby, a screw driver of a type adapted to use screw sticks and to drive one screw from the head of another screw, an electric circuit including the motor, a switch in said circuit of a type normally open, a bearing in the support for revolubly and slidably carrying the screw driver, a spring arm fixedly mounted on the support and engaging the screw driver forming a lost motion connection between the screw driver and support, a driving connection between the motor and screw driver, said switch being positioned to be closed through the spring arm lost motion connection when a screw carried by the screw driver is contacted with work whereby movement of the motor may drive the contacting screw into the work.

4. An automatic screw driving machine for driving successive screws of a screw stick into work, comprising, in combination, a support including a fixed member and a movably mounted member, means tending to hold these members in a normal position in which the movably mounted member is raised with respect to the fixed member, the movably mounted member including a mount in which a screw driver is mounted for movement axially and rotatably therein, a motor, drive means positively connecting said motor to said screw driver in all axial positions of the latter, an electric circuit and switch of a type normally held open for controlling the operation of the motor and means associated with the screw driver and positioned to be operated by axial movement thereof to close the switch for moving the screw driver when the movably mounted member is moved from its normal position to bring a screw held by the screw driver into contact with work thus axially sliding the screw driver on said support.

5. An automatic screw driving machine for driving successive screws of a screw stick into work, comprising, in combination, a support comprising two parts, one relatively fixed and the other moveably mounted thereon, means for guiding said movably mounted portion of said support on said fixedly mounted portion of said support in a vertical direction, spring means tending to hold the movably mounted part in a normal or raised position, a handle for moving the movable part from its raised position, a motor drive, a rotatably and axially movable screw driver carried by the movable part of the support and operably connected to the motor in all axial positions of the screw driver, an electric circuit including the motor, a switch on the circuit, a leaf spring connected to said movably mounted support and engaging said screw driver and operable by moving the movable part of the support from its normal raised position for closing the switch whereby said screw driver may be rotated by moving the movable part of the support to bring a screw held by the screw driver into contact with the work.

MILLER R. HUTCHISON, Jr.